May 12, 1936.    G. ANDERSON    2,040,234
SAW SWAGING TOOL
Filed Feb. 8, 1932
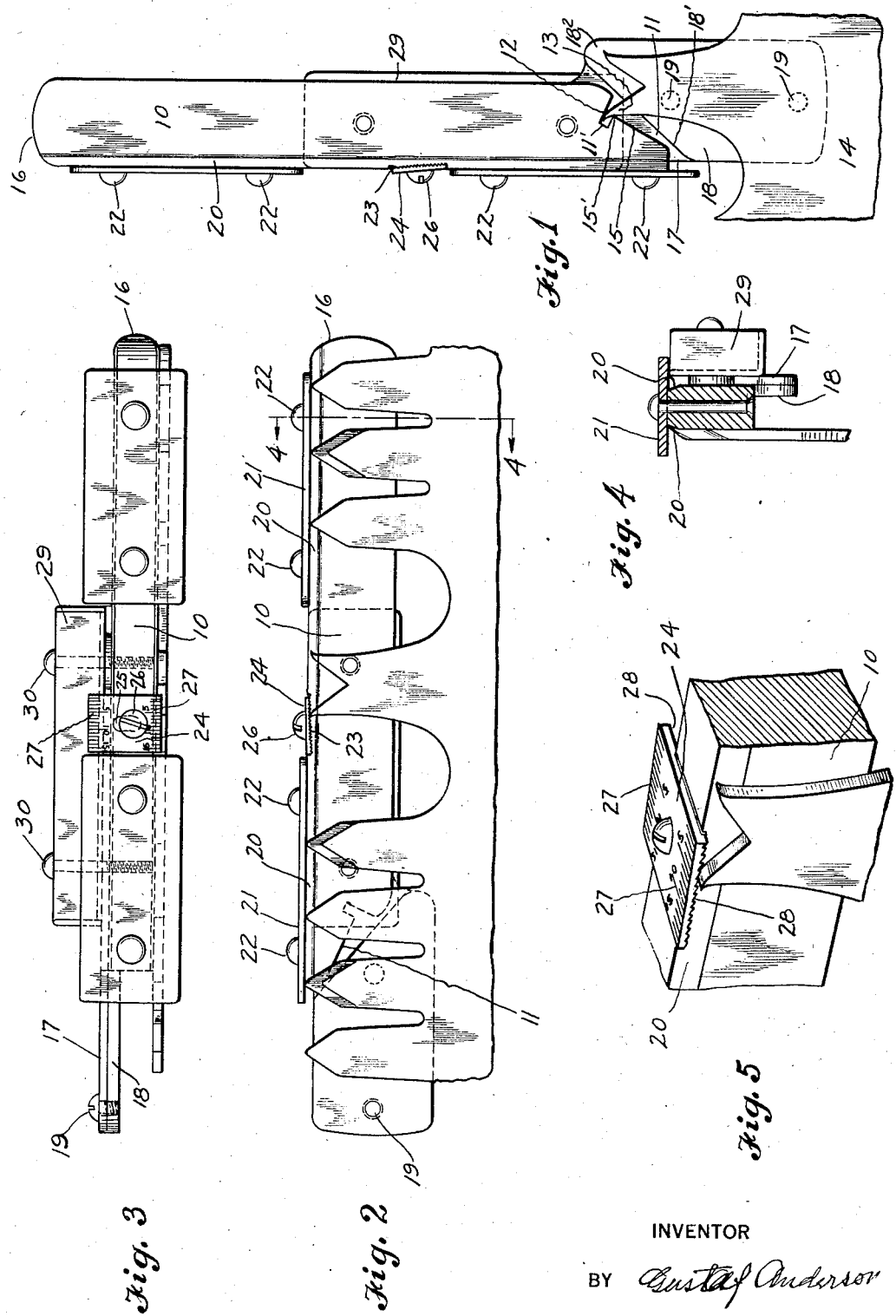
INVENTOR
BY Gustaf Anderson
ATTORNEY Patented May 12, 1936 2,040,234

UNITED STATES PATENT OFFICE 2,040,234

SAW SWAGING TOOL

Gustaf Anderson, Seattle, Wash.

Application February 8, 1932, Serial No. 591,707

3 Claims. (Cl. 76—56)

When swaging and gaging the length of raker teeth of cross-cut saws, it has heretofore been the practice to strike the raker points with a hammer held in one hand and gage their length with a gage held in the other hand. This practice requires one who is highly skilled in the use of a hammer, so as not to make miss-blows and break off the teeth points. Furthermore, it is difficult to provide a true transverse edge on the raker points by striking them direct with a hammer.

This invention relates to improvements in a saw swage for the above mentioned purposes, and has for its primary object to simplify and improve the existing art, by the provision of a saw swage of this character, that produces accurate results and requires little or no skill in the performance of the swaging operation.

Another object of the invention is to provide means adapted to bear against the side of the saw to guide the device transversely of the saw plane, so as to provide a true transverse edge on the raker teeth points of a saw.

These and other objects and advantages of the invention will be better understood from the following description, when read in connection with the accompanying drawing forming a part of this specification in which:

Figure 1 is a vertical side elevation of the device, as held for swaging the point of a raker tooth shown in full lines.

Fig. 2 is a horizontal side elevation of the device and a saw shown in full lines.

Fig. 3 is a horizontal plan view of the device.

Fig. 4 is a cross section on the line 4—4 of Fig. 2.

Fig. 5 is a perspective view on an exaggerated scale, showing a central section of the device and a raker tooth of a saw in full lines.

Referring to the drawing and more particularly to Figure 1, the numeral 10 designates the body or bar, of which an approximately right angular corner portion at one end has been cut away obliquely of the bar at 11, to provide a straight and transversely oblique anvil face 12, adapted to contact with one of the points of a raker tooth 13 of a saw 14, and a longitudinally oblique guide face 15 approximately at right angle with the anvil face, as shown in Fig. 1. The guide face 15 forming a tooth-stop 15—1 is adapted to co-act with the anvil face 12, and is spaced therefrom by an inwardly extending recess 11$^1$, for the free and unobstructed reception of one of the curved points of a raker tooth. The lower edge of the recess 11$^1$ being approximately parallel with the anvil face, or so formed, that an open space will be left beneath the curved point of a raker tooth (See Fig. 1) to allow the tooth-point to bend freely within the recess at a selective angle of curvature, by slightly tilting the device and striking the free end of the bar at 16 with a hammer or mallet. Furthermore, by reason of the space beneath the tooth-point, the swaging operation cannot injure the cutting edge on the point of the tooth.

To one side of the bar 10 is secured a guide 17, provided with an offset portion 18 having a flat face 18$^1$ adapted to be pressed firmly against the side of a raker tooth and a portion of the saw blade, to bring the anvil face 12 square across the tooth-point 13, for providing a transversely true curve and a square edge to the tooth-point, as will be readily understood upon inspection of Fig. 1. The offset portion 18 projects past the line of the lateral edge of the bar 10, so as to be opposite the full width of the tooth, of which greater portion being subjacent to the anvil face 12. The offset 18 brings the point of contact of the anvil face with the point of the raker tooth approximately in line with the longitudinal axis of the bar 10, so that the edges of the anvil face 12 can not chip or become defaced by use. The lateral projection of the offset portion 18 extends upward to a point above the tooth-point at the lateral edge of the bar 10, and serves as a guard 18$^2$ to prevent the fingers of the saw filer coming in contact with the sharp cutting edge on the tooth-point subjacent to the anvil face 12, so that no injury to the fingers of the filer can result.

By reason of the bar 10 being designed to carry a gage similar to the gage shown, described and claimed in my U. S. Patent No. 1,481,818, January 29, 1924; the guide 17 preferably consists of a flat plate adapted to be secured to either side of the bar 10, and a flat piece forming the offset 18 reversibly secured to either side of the plate 17 by screws 19 19, to accommodate either right handed or left handed saw filers, as shown in Figures 1 and 3.

Upon further inspection of Fig. 1, it will be seen that line of the offset portion 18$^1$ extends upward at an obtuse angle to a height higher than the exposed tooth-point, to constitute a guard 18$^2$, for preventing the fingers of the filer coming in contact with the sharp edge of the tooth-point, and thereby prevent injury to the fingers of the filer while manipulating the device upon the saw teeth.

With reference to the gage, the bar 10 is provided on its opposite sides with a bevel 20 20 (see Fig. 4) longitudinally of the bar along one edge to clear the set in the cutting teeth of the saw, as shown in Figs. 2 and 4. A pair of guide plates 21 21 adapted to rest upon the cutting teeth of the saw. These guide plates project laterally above the opposite sides of the bar 10 and are secured thereto in longitudinally spaced relation to form an open space between their adjacent ends. See Figs. 2 and 3. The guide plates 21 21 may be secured to the bar 10 by any suitable means, preferably by rivets 22 22 through each plate.

In the open space between the guide plates 21 21 is an inclined recess 23, cut into the bar 10 at a predetermined degree of angle, and a gage plate 24 provided with a horizontally transverse slot 25 adjustably mounted in the recess 23 by means of shims, and secured therein by a screw 26 passing through the slot and the shims into threaded engagement in the bar 10, as shown in Figs. 2, 3 and 5.

The gage plate 24 projects over the opposite sides of the bar 10, and is provided with graduation marks 27 27 on its top surface along its outer edges, to denote the inclination of the plate. On the under surface of the plate are tooth-stop notches 28 28 corresponding with the graduation marks 27 27, for showing its point of contact with the point of a raker tooth by gently sliding the device on the saw teeth, best seen in Fig. 5. See also Figs. 2 and 3.

To the opposite side from the saw engaging side of the bar 10 is secured a finger engaging block or handle 29. This block may be of any suitable form and material for the convenient handling of the device. The block 29 is secured to the bar 10 by screws 30 30 passing through openings in the block, and the guide member 17 hereinbefore described, and into threaded openings in the bar 10 for securing both of these members to the bar. See Figs. 3 and 4.

Both the block 29 and the guide plate 17 are reversible from one side of the bar 10 to the other side thereof. This makes the device adaptable for either right or left hand use. When these parts are reversed, the offset piece 18 hereinbefore described must also be reversed to the opposite side of the guide member 17, as will be readily understood upon inspection of Figs. 1 and 3.

The graduation marks 27 are arranged to denote .001 of an inch vertical variation of the gage plate 24 between any two graduation marks. When using the device, one of these graduation marks are first selected at a point where the height of the plate corresponds with the length of raker teeth required, to suit the character of the wood for which the saw is being fitted. The tool is then placed on the saw in the position shown in Fig. 2 and by gently sliding the device on the cutting teeth of the saw until the point of the raker tooth catches in one of the notches 28, on the under side of the gage plate, the length of any raker tooth that comes within the gaging range of the gage plate can be accurately ascertained. The tool is then placed on the raker point in the position shown in Fig. 1 and a blow with a hammer struck on the striking face 16 on the free end of the bar 10. The tool is again placed in a horizontal position on the saw teeth and slid along on the saw teeth as before. If the raker tooth is still too long, then the swaging operation is repeated until the raker tooth point catches in the tooth-stop notch 28 opposite the previously selected graduation mark.

Assuming that the gage plate 24 has been set back far enough to allow the outside corner of the raker point being visible from an operative view point as shown in Figs. 3 and 5, the swaging and gaging operations are then repeated, first on all the raker points that face in one direction, then on those points that face in the opposite direction. The guide face 15 serves to guide the device into position on the saw tooth and, being longitudinally oblique, allows tilting of the device in either direction longitudinally of the saw plane, to facilitate swaging of the raker points at a selective angle of curvature according to various circumstances and ideas of saw filers.

The gage plate 24 is arranged on the principle of triangulation; and when once adjusted to position does not require readjustment. The gaging range of the plate is limited only by the width of plate employed and the angle of its inclination.

The device is designed to be held in the hand of the saw filer, in such manner that it can be shifted into its respective vertical and horizontal positions by a mere "twist of the wrist", to enable the saw filer to conveniently and speedily perform the swaging and gaging operations, with accuracy and simplicity.

While I have shown and described the preferred embodiment of my invention, various minor changes may be made in form, construction and arrangement of the parts; therefore, the invention is to be considered comprehensive of all such forms, construction and arrangement of parts, as will fairly fall within the spirit of the invention and scope of the appended claims.

I claim:

1. A device of the character described, a bar having at one end a corner portion cut off to provide an obliquely straight anvil face and a guide-face approximately at right angle therewith; said guide-face forming a tooth-stop adjacent said anvil face and spaced therefrom by an inwardly extending recess having the lower edge thereof approximately parallel with said anvil face, for the free and unobstructed reception of the curved portion of one point of a raker tooth disposed against said anvil face, there being a space between the lower edge of said recess and the under surface of the curved portion of said tooth point, for the purpose described.

2. A device of the character described, a bar having at one end a corner portion cut off to provide an obliquely straight anvil face and a guide-face approximately at right angle therewith; said guide-face forming a tooth-stop adjacent said anvil face and spaced therefrom by an inwardly extending recess having the lower edge thereof approximately parallel with said anvil face, and a guide having one lateral edge extended past the line of one lateral edge of said bar, and provided with an offset portion having a flat face adapted to contact with one side of a raker tooth and a portion of the saw blade, for the purpose described.

3. A device of the character described, a bar having at one end a corner portion cut off to provide an obliquely straight anvil face and a guide-face approximately at right angle therewith; said guide-face forming a tooth-stop adjacent said anvil face and spaced therefrom by an inwardly extending recess having the lower edge thereof approximately parallel with said anvil face, and a guide having one lateral edge extended past one lateral edge of said bar to provide a guard for the purpose described.

GUSTAF ANDERSON.